United States Patent
Diachina et al.

(10) Patent No.: US 6,795,428 B1
(45) Date of Patent: Sep. 21, 2004

(54) FAST NOTIFICATION ACCESS CHANNEL FOR REALTIME USERS IN EGPRS NETWORKS

(75) Inventors: John Diachina, Garner, NC (US); Rajaram Ramesh, Cary, NC (US); Gunnar Rydnell, Ravlanda (SE)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/479,810

(22) Filed: Jan. 7, 2000

(51) Int. Cl.[7] .................................................. H04J 3/17
(52) U.S. Cl. ...................................... 370/349; 370/461
(58) Field of Search ................................ 370/329, 337, 370/338, 350, 353, 401, 349, 461

(56) References Cited

U.S. PATENT DOCUMENTS

| | | | |
|---|---|---|---|
| 4,534,061 A | | 8/1985 | Ulug |
| 5,966,378 A | * | 10/1999 | Hamalainen ................ 370/348 |
| 6,289,313 B1 | * | 9/2001 | Heinonen et al. ........... 704/270 |
| 6,327,256 B1 | * | 12/2001 | Paivike et al. ............... 370/337 |
| 6,347,091 B1 | * | 2/2002 | Wallentin et al. ........... 370/437 |
| 6,356,608 B1 | * | 3/2002 | Atarius ....................... 375/362 |
| 6,374,112 B1 | * | 4/2002 | Widegren et al. ........... 455/452 |
| 6,381,460 B1 | * | 4/2002 | Klein et al. ................. 455/450 |
| 6,463,073 B1 | * | 10/2002 | Bontu et al. ................ 370/442 |
| 6,466,544 B1 | * | 10/2002 | Sen et al. .................... 370/231 |
| 6,510,174 B1 | * | 1/2003 | Sexton et al. ............... 375/213 |
| 6,532,225 B1 | * | 3/2003 | Chang et al. ............... 370/341 |

FOREIGN PATENT DOCUMENTS

| | | |
|---|---|---|
| DE | 19723090 A1 | 6/1997 |
| DE | 19820684 A1 | 5/1998 |
| WO | WO96/31077 | 10/1996 |
| WO | WO98/28864 | 7/1998 |
| WO | WO99/13600 | 3/1999 |

* cited by examiner

*Primary Examiner*—Hassan Kizou
*Assistant Examiner*—Christopher M Swickhamer
(74) *Attorney, Agent, or Firm*—Coats & Bennett, P.L.L.C.

(57) ABSTRACT

A Fast Notification Access Channel is used in a system for multiplexing users on a shared cellular packet data traffic channel in a cellular packet data network system. The system includes a mobile station having a mobile station control system. The mobile station control system transmits packet data on the shared packet data traffic channel to a base station until it reaches an inactive period and upon having additional data to transmit transmits a notification signal to the base station, the notification signal uniquely identifying the mobile station on the shared cellular packet data traffic channel. A network control system is operatively associated with the base station. The network control system allocates uplink on the shared packet data channel to the mobile station after receiving the notification signal until the mobile station reaches the inactive period.

34 Claims, 4 Drawing Sheets

FAST NOTIFICATION ACCESS CHANNEL FOR REALTIME USERS IN EGPRS NETWORKS

BACKGROUND OF THE INVENTION

The present invention generally relates to cellular and wireless communication, and more particularly to a cellular system that multiplexes real time users with non-real time users on a shared packet data traffic channel. A mobile station user engaged in real time traffic can back off during in-active periods and enable mobile station users engaged in non-real time traffic to access the channel. A fast Notification Access Channel (NACH) enables the real time user to take the channel back with minimum delay as soon as it is needed.

Recently, there has been a trend in the telecommunication community to focus more and more on wireless packet data communication rather than circuit switched communication. With the tremendous increase of Internet users, and usage of Internet protocols, it is believed that the packet switched communication will soon become larger than the circuit switched communication that today dominates, e.g., the cellular communication. Cellular communication system manufacturers and operators are therefore looking for solutions to integrate their circuit switched services with wireless packet switched services that can provide reliable and more spectrum efficient connections for packet switched users, e.g., Internet users. This trend has made different types of packet switched communication system evolutions flourish. One of the more well known packet switched cellular systems in the telecommunications community is the extension of the present GSM (Global System for Mobile Communications) cellular communication system, called GPRS (General Packet Radio Service).

GPRS is a packet switched system that uses the same physical carrier structure as the present GSM cellular communication system and is designed to coexist and provide the same coverage as GSM. GPRS radio interface is thus based on a TDMA (Time Division Multiple Access) structured system with 200 kHz carriers divided into eight timeslots with GMSK (Gaussian Minimum Shift Keying) modulation. The multiplexing is such that several users can be allocated on the same timeslot, and use it only when data needs to be transmitted. One user can also be allocated more than one timeslot to increase its throughput of data over the air.

The GPRS specification includes a number of different coding schemes to be used dependent on the quality of the radio carrier. With GPRS, data rates well over 100 kbps will be possible.

There is also ongoing a development and standardization of a new air interface mode in GSM, which will affect both packet and circuit switched modes. This new air interface mode is called EDGE, Enhanced Data rates for Global Evolution. EDGE's main features are new modulation and coding schemes for both packet switched and circuit switched data communication. In addition to the Gaussian Minimum Shift Keying (GMSK) modulation, which today is used in both GPRS and GSM circuit switched mode, an 8 symbol Phase Shift Keying (8PSK) modulation is introduced. This modulation can provide users with higher data rates than GMSK in good radio environments.

The packet data mode with EDGE modulation is called EGPRS (Enhanced GPRS) and the circuit switched data mode is called ECSD, Enhanced Circuit Switched Data. With EGPRS, data rates over 384 kbps will be possible with EDGE.

Recent development for another TDMA based cellular system, the cellular communication system compliant to the ANSI/136 standard, below referred to as TDMA/136 has been focused on a packet data system to be integrated with the TDMA/136 circuit switched mode.

This packet data system will also be based on the new EDGE technology as defined for the GPRS extension. It will then allow TDMA/136 operators with a packet data mode to provide data rates up to 384 kbps on 200 kHz carriers with GMSK and 8PSK modulation as defined for EGPRS.

Two modes of EGPRS will be standardized for use together with TDMA/136 systems, one which relies on time synchronization between base stations in the system and one which does not. These two modes are generally referred to as COMPACT and Classic respectively.

While the evolution of cellular packet data communication initially has focused on developing a system that efficiently utilize resources to transfer delay-insensitive data, the focus is now shifting towards delay sensitive transmissions and higher quality of service requirements.

A cellular packet data capable mobile station may set up a packet data session in order to send and receive packet data. The mobile station may connect to an Internet server providing packet data service. The connection over the Internet can utilize the TCP/IP protocol for end-to-end delivery. The mobile station can access the fixed network via a packet data channel over the air-interface.

The packet data channel is a shared resource, such that several users can be statistically multiplexed on the channel. This is quite different from traditional cellular circuit switched channels, where each user has exclusive access to a channel regardless of whether or not it is actually being used to send or receive data. When the mobile station is engaged in real time traffic the associated data transmission is very much delay sensitive. This is why a circuit switched channel is good for voice applications, where a user is allocated exclusive use of a traffic channel, where it can transmit and receive speech frames. When the user starts to talk the quality of service perceived will in part be based upon the presence of delay and as such the transmission of speech related data should be delayed as little as possible. On the shared packet data channel, on the other hand, a real time user can perceive a problem in the form of a noticeable delay, if another user already occupies the channel when the real time user starts to talk. The real time user must therefore quickly get access to the packet data channel in order to minimize the delay in the transmission of the speech frames.

There are basically two known methods available for a mobile station to gain access to a shared packet data channel when it is currently not allocated ownership of the resources supported thereon. To do so it must make the base station, that is the resource allocation arbitrator, aware of the mobile station's need to transmit on the shared channel. The first method is for the mobile station to wait until it is allocated time to transmit by the base station. This will eventually occur since the base station is aware that the mobile station is present but temporarily has no allocated resources because of multiplexing in another user. The problem with the first method is that it might take considerable time until the base station allocates channel resources to the mobile station supporting a real time user. There is no way for the base station to know the real time needs of all the mobile stations that are currently sharing the packet data channel.

The second method is based on the mobile station sending a random access message on the random access channel in order to notify the base station that the mobile station needs to transmit and that the base station should therefore immediately allocate radio resources to the requesting mobile station. For the second method, the random access channel is shared by an indefinite number of mobile stations on a contention basis. The random access channel is subject to collisions and there is therefore no guarantee as to the extent of the delay experienced prior to receiving allocation of resources on the channel. Since it might take considerable time before the resource allocation request message gets through to the base station this could result in a very noticeable impact on the quality of service perceived by the real time user.

From the moment the mobile station determines it has data to transmit until the time the mobile station has acquired resource ownership on the packet data channel, no data can be sent to or received from the mobile station. For a mobile station user running a real time application this delay may result in a perceivable degradation of service quality. In the interest of enhancing the quality of service provided to users, it is therefore important to minimize this delay experienced by a mobile station as it moves from active mode with no resources allocated to active mode with resources allocated.

The present invention is directed to solving one or more of the problems discussed above.

SUMMARY OF THE INVENTION

In accordance with the invention, a fast notification channel minimizes delay for real time users to be allocated resources in a shared cellular packet data system.

Broadly, there is disclosed herein the method of multiplexing users on a shared cellular packet data traffic channel. The method comprises the steps of transmitting packet data by a first select mobile station on the shared packet data traffic channel to a base station until a transmit queue is empty; the base station thereafter allocating uplink on the shared packet data channel to a second select mobile station, the first select mobile station upon having data to transmit in its transmit queue transmitting a notification signal to the base station, the notification signal uniquely identifying the first select mobile station on the shared cellular packet data traffic channel; and the base station, after receiving the notification signal, allocating uplink on the shared packet data channel to the first select mobile station.

It is a feature of the inventive method to further provide the step of setting up a packet data session prior to the first select mobile station transmitting packet data and wherein the notification signal is assigned by the base station to the first select mobile station during setting up of the packet data session. The step of setting up the packet data session comprises assigning a select frequency to the first select mobile station by the base station, and wherein the step of transmitting the notification signal by the first select mobile station comprises transmitting a tone signal at the select frequency.

It is another feature of the invention to further provide the step of providing a notification access channel and wherein the notification signal is transmitted by the first select mobile station on the notification access channel. The step of providing the notification access channel comprises assigning select time slots of a packet random access channel to the notification access channel. The notification access channel is periodically monitored the by the base station to detect the notification signal.

It is still another feature of the invention that the step of providing a notification access channel comprises providing plural tone frequencies to be assigned to plural mobile stations transmitting packet data on the shared packet data channel. The notification access channel is periodically monitored by the base station to detect the notification signal comprising one of the plural tone frequencies. The base station is operable to detect plural tone frequencies simultaneously on the notification access channel.

There is disclosed in accordance with another aspect of the invention the method of obtaining quick access to a shared cellular packet data traffic channel. The method comprises the steps of providing a notification access channel for mobile stations engaged in packet data sessions on the shared packet data channel to request uplink from a base station; a select mobile station, upon having packet data to transmit, transmitting a notification signal to the base station on the notification access channel, the notification signal uniquely identifying the first mobile station on the shared cellular packet data traffic channel; and the base station, after receiving the notification signal, allocating uplink on the shared packet data channel to the select mobile station.

It is a feature of the invention of the inventive method to further provide the step of setting up a packet data session prior to the select mobile station transmitting packet data and wherein the notification signal is assigned by the base station to the select mobile station during setting up of the packet data session. The step of setting up the packet data session comprises assigning a select frequency to the select mobile station by the base station, and wherein the step of transmitting the notification signal by the select mobile station comprises transmitting a tone signal at the select frequency It is another feature of the invention that the step of providing the notification access channel comprises assigning select time slots of a packet random access channel to the notification access channel.

It is still another feature of the invention to provide the step of periodically monitoring the notification access channel by the base station to detect the notification signal.

There is disclosed in accordance with a further aspect of the invention, a system for multiplexing users on a shared cellular packet data traffic channel in a cellular packet data network system. The system includes a mobile station having a mobile station control system. The mobile station control system transmits packet data on the shared packet data traffic channel to a base station until it reaches an inactive period, and upon having additional data to transmit, transmits a notification signal to the base station, the notification signal uniquely identifying the mobile station on the shared cellular packet data traffic channel. A network control system is operatively associated with the base station. The network control system allocates uplink on the shared packet data channel to the mobile station after receiving the notification signal until the mobile station reaches the inactive period.

It is a feature of the invention that the notification signal is assigned by the network control system to the mobile station during setting up of a packet data session. The network control system assigns a select frequency to the mobile station. The mobile station control system transmits the notification signal by transmitting a tone signal at the select frequency.

It is another feature of the invention to provide a notification access channel comprising select time slots of a packet random access channel. The mobile station transmits the notification signal on the notification access channel. The network control system periodically monitors the notification access channel to detect the notification signal. The network control system assigns unique tone frequencies, representing the notification signal, to plural mobile stations transmitting packet data on the shared packet data channel. The network control system is operable to detect plural tone frequencies simultaneously on the notification access channel.

Further features and advantages of the invention will be readily apparent from the specification and the drawings.

BRIEF DESCRIPTION OF THE DRAWINGS

Features, objects and advantages of the present invention will become apparent to those skilled in the art by reading the following detailed description where references will be made to the appended figures in which.

DETAILED DESCRIPTION OF THE INVENTION

The present invention is now be described making reference to a GPRS based cellular packet data communication system and extensions thereof, as briefly described in the background. The invention could be used with other systems, such as a TDMA/136 system, also discussed in the background, as will be apparent.

Figure 3:
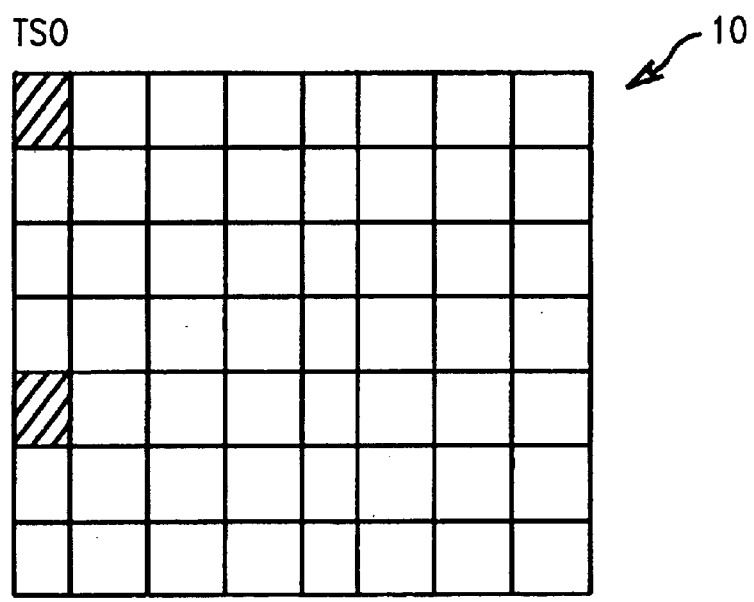
FIG. 3 is a frame sequence graph illustrating time slot allocation for a NACH channel in accordance with the invention.

In a GPRS communication system, physical channels on which communication can occur are divided into timeslots on a radio frequency carrier. Each carrier frequency is divided into eight timeslots, or eight physical channels. Eight consecutive timeslots form a GSM frame. See, for example, a frame 10 in FIG. 3 showing the eight timeslots. The timeslots (TS0–TS7) refer to both up- and downlink timeslots. A TDMA/136 system uses six timeslots.

Figure 1:
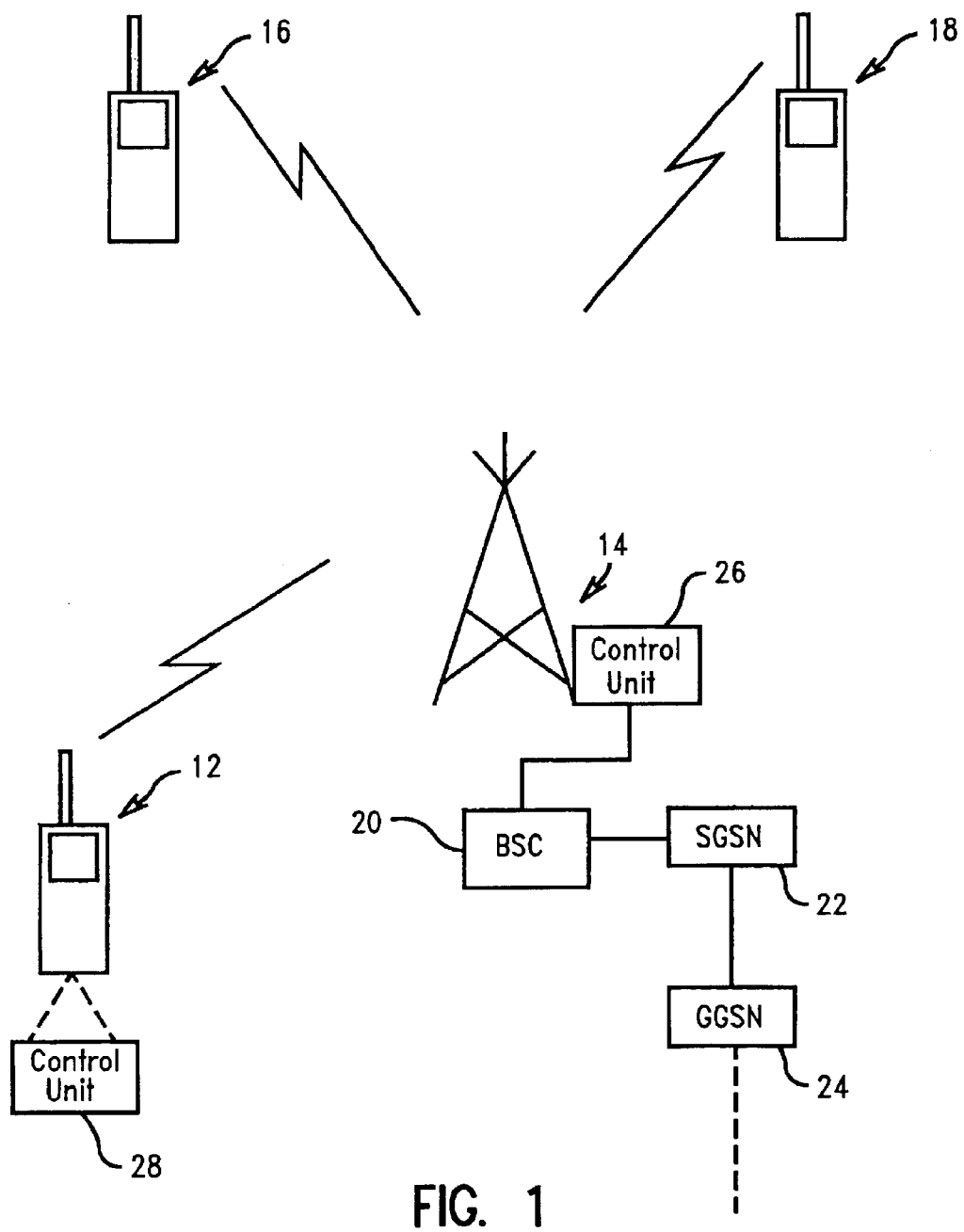
FIG. 1 illustrates an overview of mobile stations communicating in an GPRS cellular system using a fast notification access channel (NACH) in accordance with the invention.

Referring now to FIG. 1, there is illustrated a number of system nodes in an exemplary packet data communication system according to GPRS. In other exemplary systems, additional nodes may occur, or some node may be absent. A first mobile station 12 may communicate with a base station 14. Of course, more base stations, not shown, and mobile stations 16 and 18 are usually present in packet data. The base station 14 may be connected to a Base Station Control node, BSC 20, which in turn is connected to a Serving GPRS Support Node, SGSN 22, serving one or several BSCs. The SGSN 22 is typically the node controlling the packet flow to and from different base stations, via the BSCs. Another GPRS support node is a Gateway GPRS Support Node 24 connected to e.g., the Internet or other external networks (not illustrated). In FIG. 1, a control unit 26 is illustrated. It is exemplary located in the base station 14, but could alternatively be located in other network nodes as well, e.g., the BSC 20 or the SGSN 22. Control functionality may also be split between different nodes, however, for simplicity it is located in one node in the illustrated embodiment. The control unit 26 in this exemplary system controls allocation in base stations as well as transmission flows and re-selection. Thus, the control unit 26 in the base station 14 receives and possibly processes allocation requests from one of the mobile stations 12, 16 and 18. The first mobile station 12 also includes a control unit 28 for controlling its operation. Although not shown, the second and third mobile stations 16 and 18 include control units similar to the control unit 28.

The present invention relates to a new method designed to speed up the channel access process. A new access channel called the fast Notification Access Channel, NACH, is specified. The NACH is allocated to specific uplink time slots. The NACH works such that several users are multiplexed onto the NACH without contention in order to effectively provide a reservation based access channel. Time or frequency multiplexing methods are possible on the NACH and serve as the basis for providing this reservation based access channel. The NACH is used only by the mobile stations currently supporting a real time application, i.e. while in active mode on a specific packet data channel, and that currently have no packet channel resources allocated. A mobile station uses the NACH to get the attention of the base station and to indicate that it has data to send. As such, no information needs to be transmitted from the mobile station to the base station except for the identification of the requesting mobile station itself.

The mobile station can be identified by a predefined agreement of how or when the mobile station shall transmit. This agreement is typically done at the transaction establishment. A transaction may be established by the mobile station sending a Channel Request indicating relevant parameters such as QoS, Real Time application, delay requirements, throughput requirements, application duty cycle etc. The base station returns an assignment message to the mobile station indicating an allocated timeslot, User State Flag, USF, Temporary Flow Indicator, TFI, etc. In this assignment message the specific assignment to the NACH may also be included. In accordance with the invention, the mobile station transmits a specific frequency tone in a specific uplink timeslot so it can be identified and thereby get the attention of the base station. Each NACH slot can be divided into several frequency slots.

The multiplexing method is used to frequency multiplex several mobile stations onto a single NACH timeslot. By the mobile station transmitting a pure sine wave to the base station the mobile station implicitly indicates that it has data to send and that it therefore wants to receive a resource allocation on a packet data channel. The sine wave can be transmitted during the whole NACH timeslot. Different users can be assigned a unique frequency to use on the NACH when they first enter the active mode at transaction startup. In this way several users can be multiplexed on the NACH without collision. Since each mobile station transmits a pure and distinct sine wave the base station can distinguish the different users by doing narrow filtering of the received signal on the NACH. The mobile station easily creates the pure sine wave by modulating the transmitted signal with a predetermined bit pattern. For example, a +67.7 kHz pure sine wave is created by a sequence of only zeroes and a tone of −67.7 kHz is created by a sequence of alternating ones and zeroes. Other tones are possible, for example, using 8PSK modulation and a particular fixed bit pattern creates a tone of 16.9 kHz.

Tones at +/−67.7 kHz (+/−13 MHz/192) can be generated by modulating specific bit sequences using GMSK. Tones at +/−16.9 kHz (+/−13 MHz/768), +/−50.78 kHz (+/−3*13 MHz/768), +/−84.6 kHz (+/−5*13 MHz/768) and +/−118.5 kHz (+/−7*13 MHz/768), can be generated by modulating specific bit sequences using an 8PSK modulator as specified in EDGE. The tones at +/−118.5 kHz fall outside the channel bandwidth of +/−100 kHz, and thus are not preferable. Omitting these, there are still eight tones available. Thus it is possible to have eight users accessing the same physical channel with a reasonable degree of success of getting through to the base station.

Figure 2:
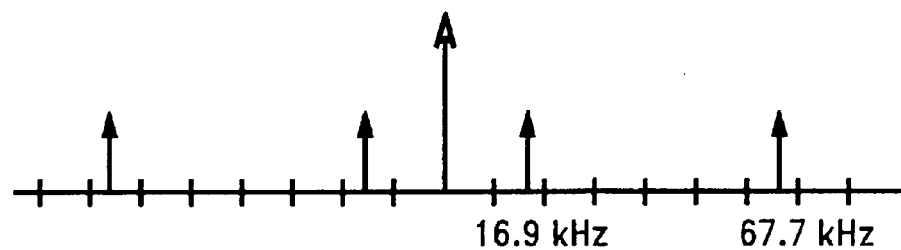
FIG. 2 is a graph illustrating plural tones on the NACH.

The base station 14 can look for multiple tones at the same time. For example, the base station 14 can detect two tones, such as the +16.9 kHz tone and the +67.7 kHz tone illustrated in FIG. 2, and decide that two mobile station's are requesting uplink access. For this to work, however, some kind of power control is needed, so that the two users are received at the base station 14 with more or less equal power level, otherwise the spurs from one of the tones may drown out the second tone. An open loop power control should be adequate. This may comprises adjusting transmit power by the mobile station in accordance with power received from the base station.

The NACH can be allocated to some of the timeslots used for the Packet Random Access Channel (PRACH) on the uplink. The delay (D) experienced by a mobile station sending a resource allocation request is:

$$D=N*T*P/R$$

where N is the number of PRACH slots per NACH slot, P is the number of real time users supported by the packet data channel, R is the number of real time users per NACH slot, and T is the time between two consecutive PRACH slots. For GSM, T=I TDMA frame=4.5 ms.

FIG. 3 illustrates an example of NACH allocation. PRACH is allocated to TS0 on the uplink. Every 4th TDMA frame 10 a PRACH timeslot is taken and assigned to operate as a NACH. This can be announced on the broadcast channel. If, for example, four users can be multiplexed onto every NACH slot and if there are four real time users allocated to the current packet data channel (they may be allocated to timeslots TS5, TS6, TS7, TS8), then the worst case delay experienced by a NACH capable mobile station will be 18 ms.

Figure 4:
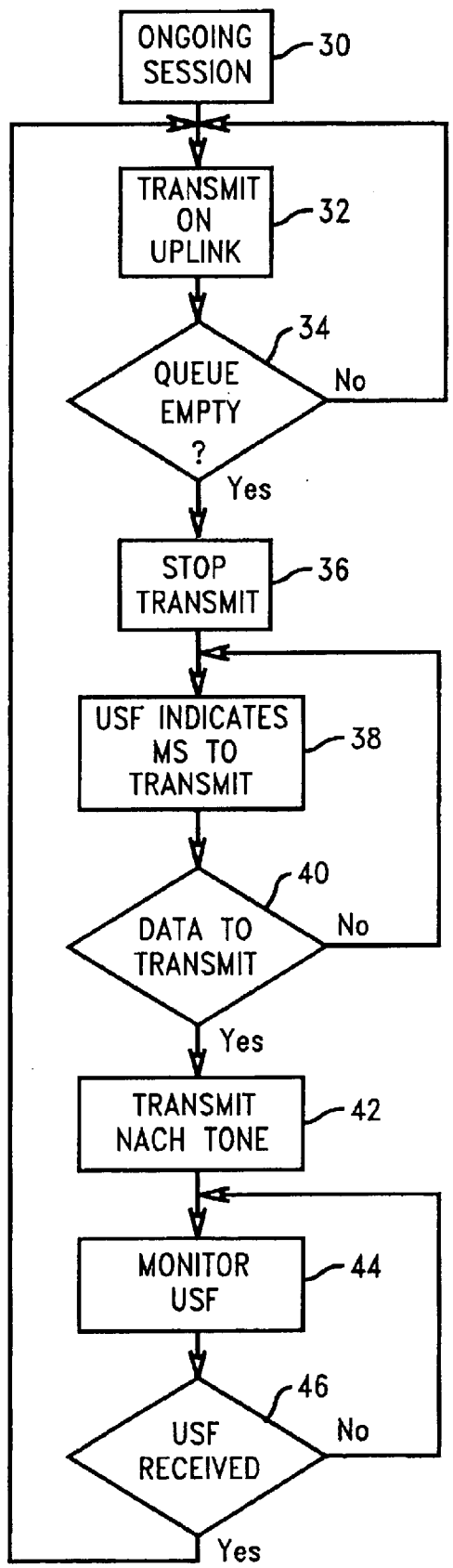
FIG. 4 illustrates a flow chart of a fast notification process as implemented in a mobile station, according to an exemplary embodiment of the present invention.
Figure 5:
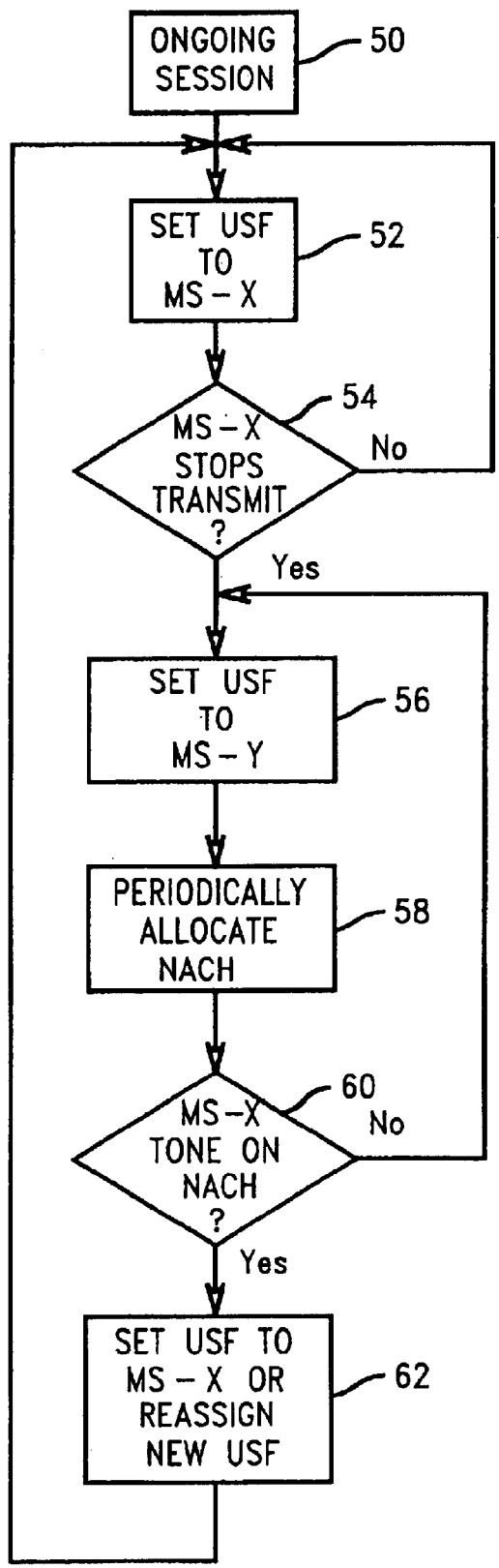
FIG. 5 illustrates a flow chart of a fast notification process implemented in a network, according to an exemplary embodiment of the present invention.

Referring to FIGS. 4 and 5, the method of multiplexing users on a shared cellular packet data traffic channel is illustrated. FIG. 4 is a flow diagram illustrating a program implemented in the mobile station control unit 28. FIG. 5 is a flow diagram illustrating a program implemented in the base station control unit 26.

Referring initially to FIG. 4, the method is implemented for the first mobile station 12 active in an ongoing data session, i.e., transmitting or receiving or is ready to transmit and receive data, at a block 30. The mobile station 12 monitors the USF on downlink in order to transmit on the uplink when the USF indicates that the first mobile station may transmit at a block 32. The first mobile station 12 transmits, by looping back to the block 32, until its transmit queue is temporarily empty, as determined at a decision block 34. Once the queue is empty, then the first mobile station 12 stops transmitting at a block 36.

At a block 38 the first mobile station 12 reads the USF which indicates other mobile stations, such as the mobile stations 16 and 18, to transmit during the inactive period of the first mobile station 12. A decision block 40 determines if the first mobile station 12 has data to transmit. If not, then control loops back to the block 38. If so, then the first mobile station 12 goes to the NACH channel and transmits its uniques tone at a block 42. The first mobile station 12 goes back to its currently allocated timeslot at a block 44 and monitors the USF. A decision block 46 waits until the USF is received. Optionally, an RLC/MAC control message may be received indicating that the first mobile station 12 is assigned to a new timeslot. In this case the first mobile station goes to the new assigned timeslot and starts to monitor the USF. Once the USF is received, then the first mobile station returns to the block 32 to take the channel back and begin transmitting.

Referring now to FIG. 5, the control program in the base station control unit 26 is active in communication with the first mobile station 12 at a block 50. The base station 14 transmits the USF on the downlink for the first mobile station 12 to transmit on the uplink, indicating that the first mobile station 12 may transmit at a block 52. A decision block 54 determines if the first mobile station 12 stops transmitting. This is detected by the base station 14 receiving no additional data or by signaling. If the first base station 12 has not stopped transmitting, then control returns to the block 52. If the first mobile station 12 has stopped transmitting, then the base station sets the USF for another mobile station to transmit at a block 56. The base station periodically allocates a NACH at a block 58 and reads a message on the NACH. A decision block 60 determines if the assigned frequency tone for the first mobile station 12 is received on the NACH. If not, then control returns to the block 56. If so, then the base station, at block 62. sets the USF to the first mobile station 12 on the channel the first mobile station is currently assigned to. The base station 14 may optionally assign the first mobile station 12 to a new channel and a new USF value on the new channel by sending an RLC/MAC message to the first mobile station 12. The control then returns to the block 52.

While the method is described in connection with the first mobile station 12, this method could be implemented in any and/or all mobile stations, as will be apparent.

Compared to the prior art, the method disclosed herein is faster, safer and can result in a noticeable increase in service quality for the end-user while engaged in a real time packet data session. Since a pure sine wave is transmitted, the implicit resource allocation request is more robust than a channel which relies on transmitting an explicit, CRC-protected, resource allocation request message. Once the base station determines that a mobile station with a real time quality of service requirement. has requested a resource allocation, then it uses existing downlink signaling mechanisms to explicitly indicate that the target mobile station has ownership of specific uplink channel resources. The base station does this as quickly as possible to minimize the delay experienced by the real time application running in the mobile station.

A further delay improvement might be that the real time mobile station, as soon as it requires the traffic channel, just hijacks the packet data channel (or a portion thereof) and relies on NACH as a back-up mechanism to accommodate the case where, for some reason, the hijacking is unsuccessful. This method relies on the capture effect, whereby the mobile station supporting a real time user, is multiplexed with mobile stations supporting non-real time users on the same packet data channel, such that all the mobile stations are carefully grouped. This grouping is done such as to ensure that the mobile station supporting the real time user is closer to the base station than any of the other mobile stations.

Although the present invention has been described with examples from a packet switched communication system compliant to the GPRS/GSM specifications, it should be noted that the solutions presented is equally well applicable to any other packet switched data communication system with the same or similar structure and functionality. The specific embodiments should therefore be considered exemplary rather than limiting the scope of the invention. The invention should rather be defined by the following claims.

We claim:

1. A method of accessing a shared cellular packet data traffic channel in a cellular packet data network, the method comprising:
   transmitting, from a mobile terminal, a pre-assigned tone over a notification access channel (NACH), said NACH comprising one or more selected timeslots of a packet random access channel (PRACH);
   periodically monitoring said NACH for said tone at the network; and
   upon receiving said tone on said NACH at the network, allocating uplink on the shared cellular packet data traffic channel to the mobile terminal transmitting said tone.

2. The method of claim 1 further comprising a base station assigning said tone to the mobile terminal during setup of a packet data session.

3. The method of claim 2 wherein assigning said tone comprises assigning a select frequency to said tone that uniquely identifies the mobile station.

4. The method of claim 3 wherein transmitting said tone comprises generating said pre-assigned tone at said select frequency using GMSK or 8PSK data modulation.

5. The method of claim 4 wherein transmitting said tone comprises transmitting a pure sine wave at said select frequency over said NACH.

6. The method of claim 1 wherein said mobile terminal transmits said tone when a user of the mobile terminal wishes to communicate voice traffic to the network.

7. The method of claim 1 wherein periodically monitoring said NACH for said tone comprises a base station periodically monitoring said NACH for a plurality of pre-assigned tones simultaneously, each said tone in said plurality of pre-assigned tones having a select frequency that uniquely identifies a different mobile terminal in the network.

8. The method of claim 7 further comprising the base station detecting a first tone from said plurality of tones transmitted over said NACH, and allocating uplink to the mobile terminal identified by said first tone.

9. The method of claim 1 wherein allocating uplink comprises allocating one or more selected timeslots on the shared cellular packet data traffic channel to the mobile terminal identified by said tone.

10. A cellular packet data network having a base station, a mobile terminal, and a shared cellular packet data traffic channel, said system comprising:
    a notification access channel (NACH) comprising one or more selected timeslots of a packet random access channel (PRACH);
    a mobile control system associated with the mobile terminal that generates and transmits a pre-assigned tone over said NACH to request access to the shared cellular packet data traffic channel; and
    a network control system associated with the base station that periodically monitors said NACH and allocates uplink on the shared cellular packet data traffic channel to the mobile terminal upon receiving said pre-assigned tone.

11. The network of claim 10 wherein said network control system further allocates said one or more selected timeslots that comprise said NACH.

12. The network of claim 10 wherein said network control system further assigns said tone to the mobile terminal during a setup of a packet data session.

13. The network of claim 12 wherein said tone has a select frequency that identifies the mobile terminal.

14. The network of claim 13 wherein said select frequency is taken from the group consisting of +/−67.7 kHz (+/−13 MHz/192), +/−16.9 kHz (+/−13 MHz/768), +/−50.78 kHz (+/−3*13 MHz//768), +/−84.6 kHz (+/−5*13 MHz/768), and +/−118.5 kHz (+/−7*13 MHz/768).

15. The network of claim 10 wherein said network control system is operable to periodically monitor said NACH for a first pre-assigned tone in a plurality of pre-assigned tones, each said pre-assigned tone having a select frequency that uniquely identifies a different mobile terminal in the network.

16. The network of claim 10 wherein said network control system is operable to communicate said NACH to the mobile terminal over a common control channel.

17. The network of claim 10 wherein said mobile control system generates said pre-assigned tone using GMSK or 8PSK data modulation.

18. The network of claim 17 wherein said mobile control system generates said pre-assigned tone by modulating a unique bit sequence, said unique bit sequence identifying said pre-assigned tone having a select frequency.

19. The network of claim 10 wherein said mobile control system transmits said pre-assigned tone as a pure sine wave over said NACH.

20. The network of claim 10 wherein said network is a GPRS system.

21. The network of claim 10 wherein said network is a TDMA/136 system.

22. A mobile terminal for use in a cellular packet data network having a plurality of users multiplexed on a shared channel, the mobile terminal comprising:
    a control system to generate a pre-assigned tone that identifies the mobile terminal;
    a transmitter that transmits said pre-assigned tone over a notification access channel (NACH), said NACH comprising one or more selected timeslots of a packet random access channel (PRACH);
    a receiver that receives a resource allocation on the shared channel from the network.

23. The mobile terminal of claim 22 wherein said pre-assigned tone has a select frequency that uniquely identifies the mobile terminal.

24. The mobile terminal of claim 23 wherein said control system generates said pre-assigned tone using GMSK or 8PSK modulation.

25. The mobile terminal of claim 24 wherein said control system generates said pre-assigned tone by modulating a unique bit sequence, said unique bit sequence identifying said pre-assigned tone having said select frequency.

26. The mobile terminal of claim 23 wherein said control system generates said pre-assigned tone having said select frequency as a pure sine wave.

27. The mobile terminal of claim 22 wherein said pre-assigned tone is assigned by a base station in the network during setup of a packet data session.

28. The mobile terminal of claim 22 wherein said resource allocation comprises one or more selected timeslots on an uplink.

29. A base station for use in a cellular packet data network having a plurality of users multiplexed on a shared channel, the base station comprising:
    a control system to allocate a notification access channel (NACH) comprising one or more selected timeslots of a packet random access channel (PRACH);

said control system operative to monitor said NACH for one or more pre-assigned tones simultaneously, each said pre-assigned tone uniquely identifying a different mobile terminal in the network.

30. The base station of claim 29 wherein said control system assigns a first pre-assigned tone to a first mobile terminal in the network, said first pre-assigned tone having a first select frequency that uniquely identifies said first mobile terminal.

31. The base station of claim 30 further comprising a transmitter to transmit a select bit sequence to said first mobile terminal, said bit sequence uniquely identifying said first pre-assigned tone having said first select frequency.

32. The base station of claim 31 wherein said control system monitors said NACH for said first pre-assigned tone by monitoring said NACH for the presence of a pure sine wave at said first selected frequency.

33. The base station of claim 31 wherein said control system detects said first pre-assigned tone having said first select frequency from said one or more pre-assigned tones received over said NACH, each of said one or more pre-assigned tones having a distinct select frequency.

34. The base station of claim 33 wherein said control system allocates uplink to the first mobile terminal upon receiving said first pre-assigned tone over said NACH.

* * * * *